Aug. 13, 1940.    C. NESS    2,211,430
COMBINED SHIPPING CONTAINER AND GAS GENERATOR
Filed Feb. 23, 1934
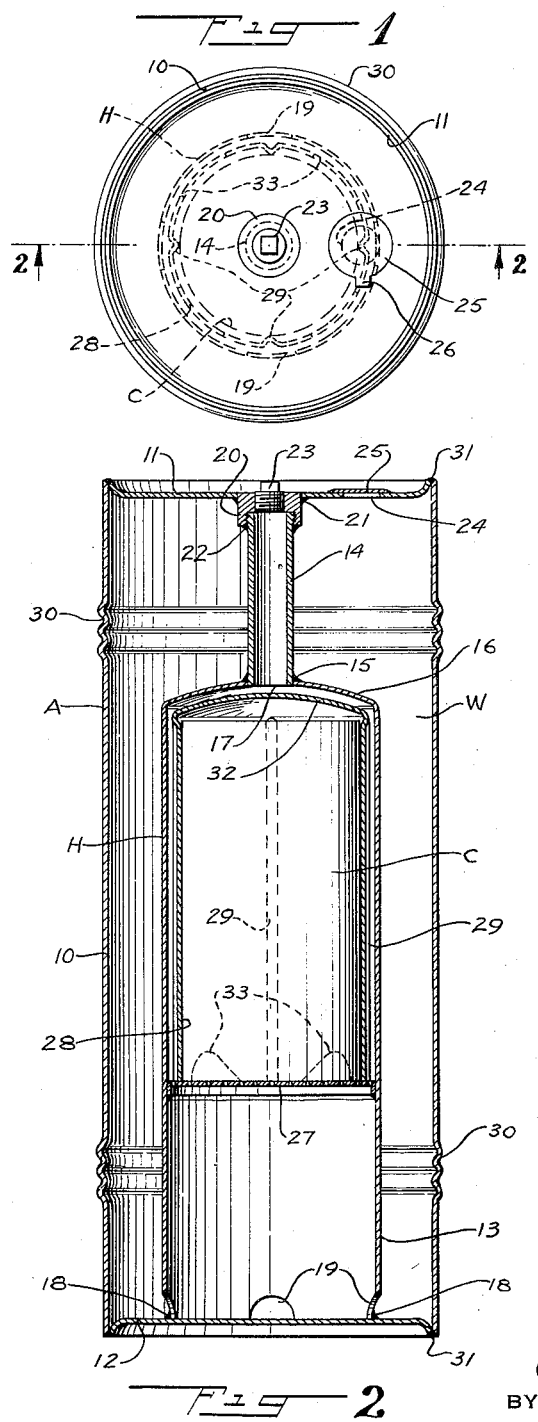
INVENTOR
CHARLES NESS
BY
*E. R. Greenewald*
ATTORNEY Patented Aug. 13, 1940

2,211,430

UNITED STATES PATENT OFFICE 2,211,430

COMBINED SHIPPING CONTAINER AND GAS GENERATOR

Charles Ness, Indianapolis, Ind., assignor, by mesne assignments, to Union Carbide and Carbon Corporation, a corporation of New York Application February 23, 1934, Serial No. 712,503

1 Claim. (Cl. 48—22)

This invention relates to means for delivering a potential supply of gas, and to means for storing and shipping dry chemical material suitable for use in generating gas, such means including a container that is convertible into a gas generator when the chemical material therein is to be utilized to produce gas. The invention has more particular reference to delivering a potential supply of acetylene in a non-refillable calcium carbide shipping container that is readily convertible into an acetylene generator, and is adapted to be discarded with the carbide residue therein when the carbide has been exhausted.

When acetylene is required for heating purposes in oxy-acetylene welding or cutting, or for lighting, especially at isolated points, it is often supplied from a heavy steel cylinder containing a quantity of the gas under high pressure dissolved in acetone stored in a porous mass within the cylinder. The cost of shipping such cylinders containing dissolved acetylene, from the charging plant to the customer and of returning the empty cylinders for recharging is a substantial item of expense. In other instances acetylene is produced at the place where it is used by a generator especially designed to generate this gas from calcium carbide, in which case the generator as well as one or more containers of calcium carbide usually must be transported to the point of use, which also involves considerable expense and the possible deterioration or waste of unused carbide.

The main object of the invention is to reduce such transporting costs and other losses in delivering a potential supply of gas, such as acetylene, by shipping a charge of gas-producing dry chemical material, such as calcium carbide, in an improved container that may be converted into a gas generator, such as an acetylene generator, at the place of use without removing the chemical material from the container, which may be economically discarded with the chemical residue, such as the carbide residue, therein after the chemical material has become exhausted.

Another object of the invention resides in providing a charge of gas producing chemical material, such as calcium carbide, which is enclosed in a non-refillable container in which it is shipped in dry condition to the point of use, where gas is generated in the container from the chemical material and then the chemical material and the container are discarded all without removing the chemical material from the container.

Another object of the invention is to provide a shipping container for dry chemicals, such as calcium carbide, which may be converted into a gas generator, such as an acetylene generator, at the place of use, without removing the chemical material from the container.

Cylinders of gas and gas generators, having sufficient capacity to supply gas for heating and lighting, are comparatively expensive and therefore are usually returned. They are also comparatively heavy and should be handled with care. Furthermore, they are affected by weather conditions and therefore should be somewhat protected during transportation, storage, and in some cases during use.

Therefore, another object of this invention is to provide a container for transporting a potential supply of gas, such as acetylene, that is comparatively low in cost so that it need not be returned; is relatively light in weight so that it may be easily handled; is sufficiently strong and rugged to withstand the shocks of shipment; is not affected by the ordinary conditions of temperature and moisture encountered during transportation and storage; is efficient in operation as a generator of gas; and has no loose or separate parts that are liable to become misplaced or lost.

Another object of this invention is to provide an improved package of dry chemical, such as calcium carbide. These and other objects and the novel features of the invention will be more fully disclosed and described in the following specification and the accompanying drawing, in which:

Fig. 1 is a top plan view, and

Fig. 2 is a vertical sectional view on the line 2—2 of Fig. 1, of a sealed package of chemical material comprising a combined shipping container and gas generator adapted for effecting the steps according to the present invention.

The preferred form of the apparatus according to this invention, as illustrated in the drawing, is embodied in a unitary sealed package of calcium carbide comprising a calcium carbide shipping container that is readily convertible into an acetylene gas generator. The improved shipping container comprises an outer casing or shell A and a holder H integrally secured within the casing A, which holder includes fixed receptacle means within which is rigidly and non-removably supported a charge C of gas producing chemical material, such as calcium carbide, in spaced relation to the top, bottom and side walls of the casing A. The casing A is formed with a substantially smooth, uninterrupted external surface, permitting convenient and economical storage and transportation of the container, and is hermetically sealed to prevent access of moisture and moisture bearing air to the carbide during storage and shipment; and the holder H is so mounted within the casing that the charge of carbide may be safely handled and shipped to a point of use where the casing may be fitted with an appropriate gas delivery pipe and valves and filled with water to generate acetylene. For this purpose the carbide holder H is so constructed that, when the container is converted into a generator, it may serve also as a gas collecting bell and as the inner wall of a water chamber W that communicates with the interior of the holder below the carbide therein.

The casing A may consist of a cylindrical wall 10 which is closed at its ends by the top and bottom walls 11 and 12; and the holder H is substantially tubular and rigidly secured to the walls 11 and 12 but spaced from and held substantially concentrically within the wall 10, so as to provide the annular water chamber W. The holder H may consist of a shell 13 and a pipe or conduit 14 secured together by a welded gas-tight joint 15. The shell has a top wall 16 provided with a central opening 17 which registers with the lower end of the pipe 14 at the joint 15. The lower end of the shell is secured, as by welds 18, to the inside of the bottom casing wall 12; and said end may be recessed at several points to provide ports or openings 19 adapted to admit water from the chamber W into the holder to react with the carbide therein. The upper end of the pipe 14 may be rigidly secured gas-tightly to a gas outlet opening in the top casing wall 11. For this purpose, a bushing 20 may be secured, as by a circumferential weld 21, to the inside of the wall 11 and into register with a central opening therein. The upper end of the pipe 14 may be threaded into the larger inner end of the outlet passage through the bushing, and may be additionally secured and sealed by a circumferential weld 22. The smaller outer end of the passage through the bushing may be closed and sealed for example by a screw plug 23. When the container is to be put in service as a generator, the plug 23 may be removed and, in its place, the end of a suitable gas delivery pipe may be secured to the bushing. Thereupon, the chamber W may be filled with the proper amount of water through an opening 24 in the top wall 11, which opening is normally sealed by a suitable readily detachable cap, such as the disk 25 having its edge soldered to the wall 11 and provided with an ear 26 adapted to be gripped by a pair of pliers to tear off the disk.

The charge C of calcium carbide may be of various forms, but is preferably cast or molded in a one-piece cake that is supported upon a partition in the form of a perforated support or grating 27 secured to the inside of the shell 13 at a substantial distance above the openings 19. A cover 28 is desirably fitted over the carbide charge so that moisture condensed in and returning from the pipe 14 will not come directly into contact with the carbide. The cover 28 is preferably provided with a closed top wall 32 that is crowned or dished upward so that water will not collect thereon. The diameter of the carbide cake is preferably slightly less than the inside diameter of the cover 28 so that the carbide will move downward as consumed and rest on the grate 27, and the diameter of the cover 28 is preferably slightly less than the inside diameter of the shell 13 so as to provide a narrow annular passage between the cover 28 and the shell 13 for conducting acetylene from the space below the carbide to the upper part of the shell and to the pipe 14. A number of vertical ribs 29 may be pressed inwardly in the side wall of cover 28 so that the carbide cake will have less tendency to bind in the cover and will feed downward more uniformly as it is consumed, and the lower edge of the side wall of cover 28 that rests on grate 27 may be provided with a serration or notches 33 so that the gas generated within the cover will discharge at a more uniform rate. The notches 33 also provide for a greater exposure of the lower end of the carbide to the water when gas is to be generated at a high rate.

The casing A, the shell 13 and the cover 28 are preferably made of light sheet metal. The cylindrical wall 10 may be reinforced by circumferential ribs 30; and the walls 11 and 12 are preferably permanently secured to the ends of the wall 10 by gas-tight joints, as by the circumferential welds 31; and the top wall 11 may be dished so that the plug 23 and the sealing disk 25 will be located below the top margin of the container.

When the improved container and its contents of calcium carbide have been shipped to some point of use, the plug 23 and disk 25 are removed, and a suitable delivery pipe is connected to the bushing 20. Then water, sufficient to fill the chamber W almost to the top, is poured in through the opening 24. The water, having passed through the openings 19 and through the grating 27 into contact with the carbide, will start generating acetylene, which passes up through the shell 13, pipe 14 and into the delivery pipe for use. The gas generation is automatically regulated by the pressure in the gas collecting bell and the delivery devices connected thereto. When the pressure in the bell rises above a value determined by the head and pressure of water in the chamber W, the water will be pushed downward in the shell 13 and held away from and out of contact with the carbide until the gas pressure drops again sufficiently to permit the water in the shell to rise again and touch the carbide. Additional water may be supplied to the chamber W through the opening 24, which latter also serves as a vent.

Various changes may be made in the details of construction, such as the form of the means employed to seal the openings in the container, and the form and relative arrangement of the component parts may vary without departing from the principles of the invention.

I claim:

A combined shipping container and gas generator comprising a casing provided with a gas outlet and an opening constituting a water inlet and a vent; detachable means normally sealing both said outlet and said opening during the storage and shipment of said combined container and generator; a holder constituting a receptacle for chemical material and a gas generating and collecting chamber, said holder being integrally secured within and laterally spaced from said casing to provide a water chamber around said holder; fixed means for rigidly and non-removably supporting a charge of gas-producing chemical material within said holder; a conduit connecting said gas outlet to the gas collecting chamber of said holder; and passage means establishing communication between said water chamber and the interior of said holder below such charge-supporting means, said casing having a substantially smooth uninterrupted external surface whereby said combined shipping container and gas generator is adapted for convenient and economical storage and transportation.

CHARLES NESS.